Figure 4:
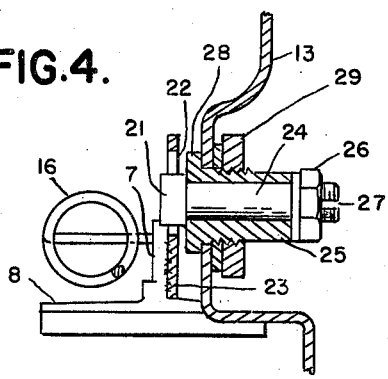

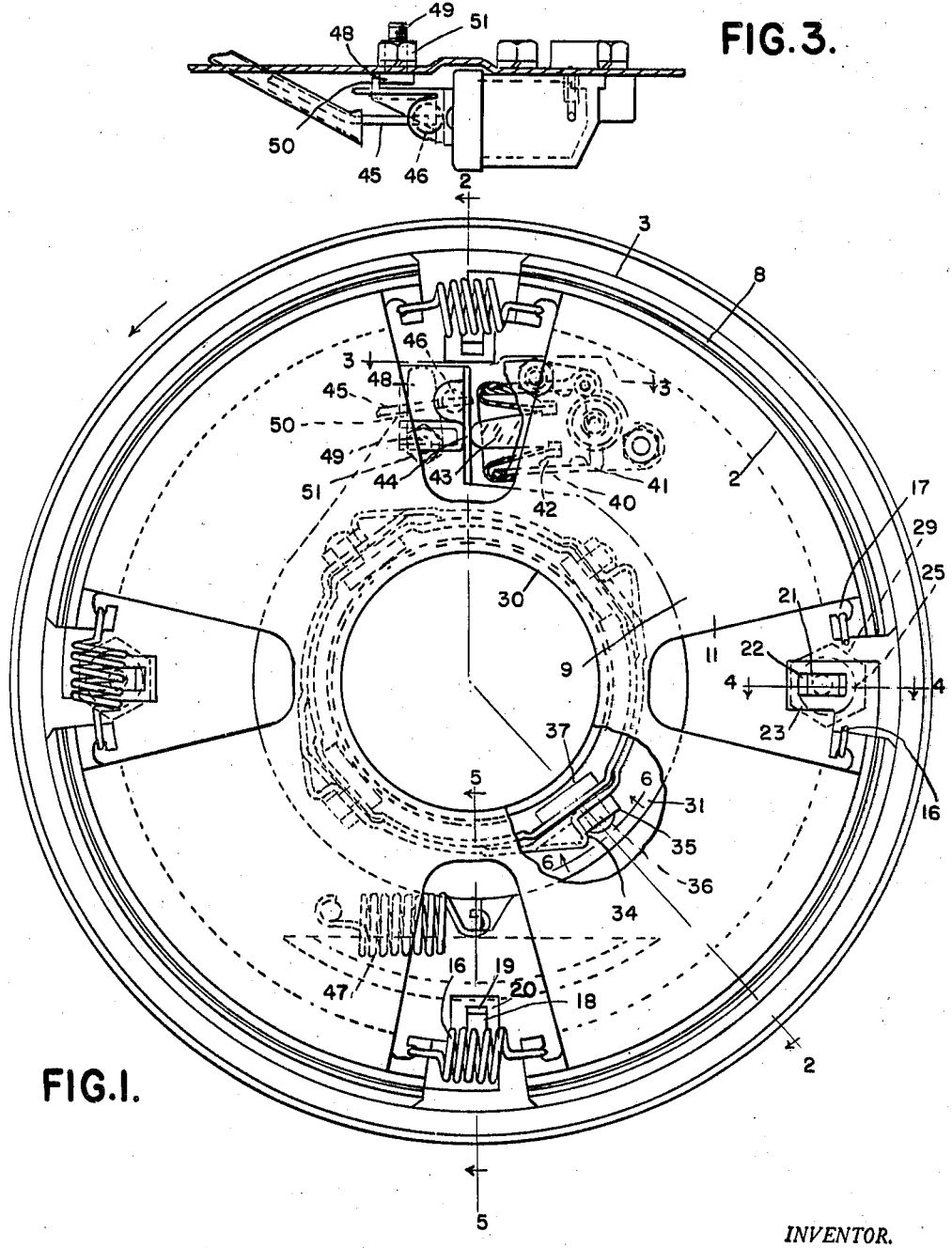

May 16, 1944.　　　　P. M. FREER　　　　2,348,893
BRAKE
Filed July 26, 1943　　　　2 Sheets-Sheet 2

INVENTOR.
PHELPS M. FREER
BY
Whittemore Hulbert & Belknap
ATTORNEYS

Patented May 16, 1944

2,348,893

UNITED STATES PATENT OFFICE 2,348,893

BRAKE

Phelps M. Freer, Detroit, Mich.

Application July 26, 1943, Serial No. 496,190

4 Claims. (Cl. 188—78)

The invention relates to brakes and refers more particularly to brakes of that type having a brake drum and internal brake shoes movable against the drum by means having an axially movable central portion and a radially movable outer portion.

The invention has for one of its objects to provide an improved brake of the above mentioned type having an improved actuating mechanism for exerting a powerful force.

The invention has for another object to provide an improved actuating mechanism which is so constructed that it imposes but little frictional resistance to movement.

The invention has for a further object to provide an improved actuating mechanism which is relatively simple in construction and which may be readily manufactured and assembled.

With these as well as other objects in view, the invention resides in the novel features of construction and combinations and arrangements of parts as more fully hereinafter set forth.

Figure 5:
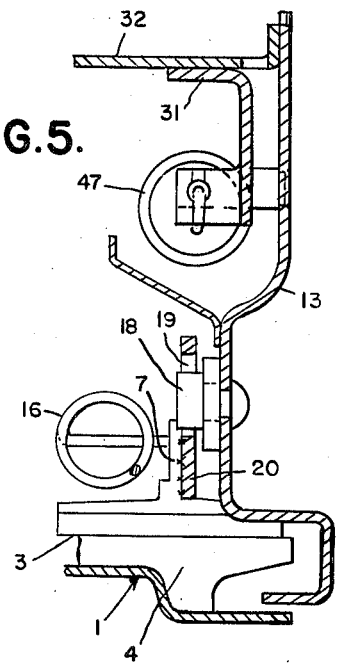
Figure 2:
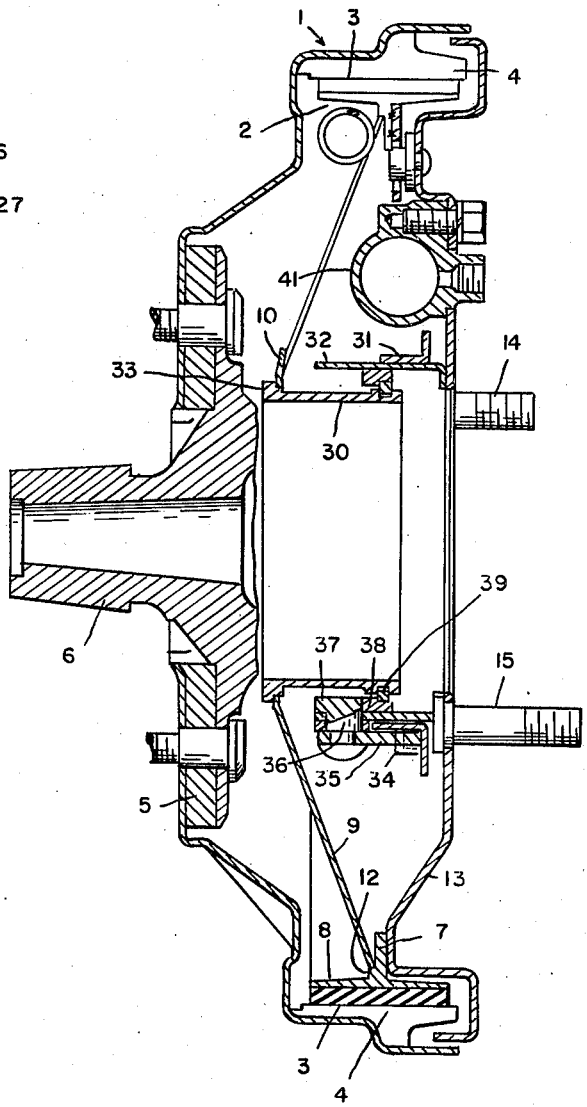
Figure 6:
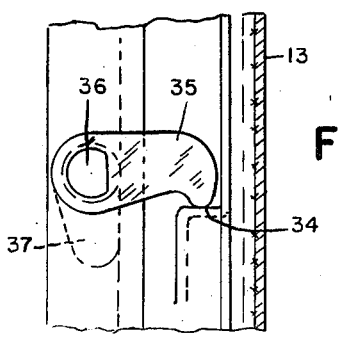

In the drawings:

Figure 1 is an elevation, with parts broken away and in section, of a brake embodying the invention;

Figures 2, 3, 4, 5 and 6 are cross sections on the lines 2—2, 3—3, 4—4, 5—5 and 6—6, respectively, of Figure 1.

The brake comprises the brake drum 1 and the internal brake shoes 2 movable generally radially against the internal friction face 3 of the annular flange 4 of the drum. The drum, as shown, is mounted upon the fixed flange 5 of the hub 6, the fixed flange being provided with suitable means for securing a vehicle wheel thereto. The shoes preferably have T-section bodies with radial webs 7 and axial flanges 8, to which latter the brake linings are secured.

For generally radially moving the shoes, there is the resilient dished disc 9 having the central portion 10 and the radiating spokes 11, the central portion being axially movable and the spokes having radially outer ends which are radially movable. There is one spoke for each shoe and the radially outer end of each spoke engages an arcuate shoulder 12 formed on the web 7 of the associated shoe. The disc is dished toward the webs of the shoes and serves to retain the webs against the backing plate 13 which is fixed either upon the axle housing or the steering spindle of the vehicle by suitable means, such as the upper and lower pairs of bolts 14 and 15, respectively. 16 are coil springs between the adjacent ends of the shoes for resiliently holding the shoes on the radially outer ends of the spokes. As shown, the webs of the shoes are formed with the bayonet-shaped openings 17 for receiving the hooked ends of the coil springs.

The shoes 2 are individually anchored and the anchoring arrangement is such that the shoes may be adjustably centered vertically relative to the drum. The anchors are located at the trailing ends of the shoes with the drum normally rotating in the direction of the arrow in Figure 1. The anchors for the upper right and lower left shoes are alike and each anchor comprises the block 18 fixedly secured to the backing plate 13 as by being riveted thereto and slidable in the radial slot 19 formed in the plate 20. The plate is fixedly secured to the trailing end portion of the web 7 of either the upper right or the lower left shoe and extends circumferentially beyond the trailing end to position its radial slot with the vertical diametral line passing through its center. The anchors for the upper left and lower right shoes are alike and each anchor comprises the polygonal head 21 engaging the radial opening 22 formed in the plate 23 which is secured to the trailing end portion of either the upper left or the lower right shoe and extends beyond the trailing end thereof to a position such that the horizontal diametral line of the brake passes through the middle of the slot. The polygonal head 21 is integral with the shank 24 which extends through the eccentric 25 and is externally threaded beyond the eccentric to receive the nut 26 for clamping the head to the eccentric. Th shank is also formed beyond the nut with the diametral slot 27 for receiving a suitable tool, such as a screw driver, to position the head so that its major axis extends radially of the brake. The eccentric 25 extends through and is mounted on the backing plate 13, the eccentric having the enlargement 28 which is adapted to be clamped against the backing plate by the nut 29 threaded upon the eccentric. The lengths of the radial slots are greater than the lengths along the major axes of the blocks and heads to provide radial clearance permitting radial movement of the trailing end portions of the shoes.

With this construction, it will be seen that each of the eccentrics 25 can be rotatably adjusted upon the backing plate 13 after the nuts 29 have been loosened. Also that the heads 21 can be rotatably adjusted after the nuts 26 have been loosened to radially position the major axes of the heads. By adjusting the anchors for the upper left and lower right shoes, all the shoes may be simultaneously adjusted through the operation of the disc to vertically raise or lower the shoes to thereby center the same in the drum.

To axially move the central portion 10 of the resilient dished disc 9 and thereby flatten the disc and radially move the shoes 2 against the brake flange 4, I have provided the tubular member 30 operatively connected to the central portion and the rotatable ring 31 operatively connected to the tubular member. The tubular member and the ring extend axially, the tubular member extending within and being spaced from the tubular bracket 32 and the ring encircling and being mounted on the tubular bracket. The tubular bracket is fixedly secured to the backing plate 13 as by being welded thereto. The tubular member 30 has at its outboard end the radial flange 33 for abutting the outboard side of the central portion 10 to operatively connect the tubular member to the disc. The ring is provided with the angularly spaced radial shoulders 34 which abut the generally axially extending levers 35 at the radially outer side of the tubular bracket 32. These levers are fixed to the radially outer ends of the pins 36 which are journaled in the tubular bracket and to the inner ends of which are fixed the generally tangential levers 37 which are located at the radially inner side of the tubular bracket. The levers 37 are engageable with the outboard side of the abutment ring 38, which latter is held from disengagement from the tubular member 30 by the split ring 39. To secure extended bearing of the levers 37 on the abutment ring 38 the axes of the pins 36 are inclined to the radii passing through the axes so that the axes are parallel to the radii passing through the middles of the levers 37 and the levers 37 are at right angles to the radii passing through their middles.

40 is a fluid pressure operated actuator or wheel cylinder mounted on the backing plate 13 and extending generally chordwise of the brake. The actuator comprises the cylinder 41, the piston 42 slidable within the cylinder and the piston rod 43 which is engageable with the radially extending projection 44 formed upon the ring 31. The ring may also be rotated, if desired, mechanically by means of the cable 45 having secured to an end thereof the ball 46 which is engageable with a socket formed in the projection 44.

To retract the ring 31 and to hold the same in retracted position, I have provided the coil spring 47 which is connected at one end to the backing plate 13 and at the other end to the ring 31 diametrically opposite the point of engagement of the piston rod with the radial projection of the ring.

To predeterminedly position the parts when retracted, I have provided the lever 48 which is fixed upon the shaft 49 and which is engageable with the transverse flange 50 formed upon the radial projection 44. The shaft 49 is rotatably adjustable in the backing plate 13 and is adapted to be secured in its various positions of rotative adjustment by means of the nut 51.

In operation it will be seen that when braking fluid is forced under pressure into the actuator 40 the piston rod 43 acting upon the radial projection 44 of the ring 31 causes this ring to rotate in a counterclockwise direction, as viewed in Figure 1, which is also in the direction of normal rotation of the drum. The ring upon rotating acts through its radial shoulders 34 upon the levers 35 to swing the same and these levers through the pins 36 cause the levers 37 to swing, thereby moving the abutment ring 39 in an inboard direction and correspondingly moving the tubular member 30 to flatten the disc 9. As a result, the shoes 2 are moved generally radially outwardly against the brake flange of the drum. It is apparent that the same operation may be secured by pulling upon the cable 45. Upon releasing the braking pressure the coil spring 47 returns the ring 31 to its normal position, as determined by engagement of the transverse flange 50 with the lever 48. During the retraction of the ring 31, the disc 9 returns to its normal position by reason of its inherent resiliency and the coil springs 16 serve to move the shoes radially inwardly and maintain the same in engagement with the radially outer ends of the spokes of the disc.

What I claim as my invention is:

1. In a brake, the combination with a brake drum, internal brake shoes and means for moving said shoes against said drum, said means comprising a member having an axially movable central portion and a radially movable outer portion, of mechanism for axially moving said central portion comprising a stationary tubular bracket, angularly spaced levers pivoted on said bracket and operatively connected to said central portion, and a rotatable ring on said bracket for swinging said levers.

2. In a brake, the combination with a backing plate, a brake drum, internal brake shoes, and means for moving said shoes against said drum, said means comprising a member having an axially movable central portion and a radially movable outer portion, of mechanism for axially moving said central portion comprising a tubular bracket mounted on said backing plate, a tubular member secured to said central portion and extending within said bracket, an abutment ring on said tubular member, levers at the radially inner side of and pivoted on said bracket and engageable with said abutment ring, levers at the radially outer side of said bracket operatively connected to said first mentioned levers, and a rotatable ring on said bracket for swinging said last mentioned levers.

3. In a brake, the combination with a backing plate, a brake drum, internal brake shoes and means for moving said shoes against said drum, said means comprising a member having an axially movable central portion and a radially movable outer portion, of mechanism for axially moving said central portion comprising an axially extending tubular member operatively connected to said central portion, an axially extending tubular bracket mounted on said backing plate and extending over said tubular member, a rotatable ring encircling said bracket and operatively connected to said tubular member, means at one side of said ring for rotating the same in one direction and a retractor spring connected to said ring at the diametrically opposite side thereof.

4. In a brake, the combination with a brake drum, internal brake shoes, and means for moving said shoes against said drum, said means comprising a member having a central portion movable substantially axially of said drum and an outer portion movable substantially radially of said drum, of means for moving said central portion comprising an actuating member rotatable about the axis of said drum, a pivotal lever normally extending substantially axially of said drum and having a portion operatively connected to said actuating member, and a second lever operatively connected to and extending transversely of said first mentioned lever and having a portion movable substantially axially of said drum and operatively connected to said central portion.

PHELPS M. FREER.